(12) United States Patent
Hsieh

(10) Patent No.: US 7,091,947 B2
(45) Date of Patent: Aug. 15, 2006

(54) APPARATUS AND METHOD FOR PROLONGING LAMP LIFETIME

(75) Inventor: Kuan-Hong Hsieh, Tu-cheng (TW)

(73) Assignee: HONHAI Precision Industry Co., Ltd., Tu-cheng (TW)

( * ) Notice: Subject to any disclaimer, the term of this patent is extended or adjusted under 35 U.S.C. 154(b) by 0 days.

(21) Appl. No.: 10/977,854

(22) Filed: Oct. 29, 2004

(65) Prior Publication Data
US 2006/0049780 A1    Mar. 9, 2006

(30) Foreign Application Priority Data
Sep. 7, 2004    (TW) ................ 93120633 A

(51) Int. Cl.
G09G 3/36    (2006.01)
H05B 37/02    (2006.01)

(52) U.S. Cl. .................... 345/102; 313/291

(58) Field of Classification Search ............ 315/293, 315/291, 295, 296, 306; 363/18, 23; 345/660, 345/45, 49, 50, 76, 87, 102
See application file for complete search history.

(56) References Cited
U.S. PATENT DOCUMENTS
4,112,334 A    9/1978    Hodge ................ 315/171

| | | | |
|---|---|---|---|
| 5,828,178 A * | 10/1998 | York et al. | 315/151 |
| 6,188,181 B1 * | 2/2001 | Sinha et al. | 315/293 |
| 6,804,129 B1 * | 10/2004 | Lin | 363/98 |
| 6,958,919 B1 * | 10/2005 | Kung | 363/17 |
| 2005/0174818 A1 * | 8/2005 | Lin et al. | 363/98 |

* cited by examiner

Primary Examiner—Shih-Chao Chen
Assistant Examiner—Minh Dieu A
(74) Attorney, Agent, or Firm—Tim Tingkang Xia, Esq.; Morris, Manning & Marti

(57) ABSTRACT

An apparatus for prolonging lamp lifetime by reducing luminance of a least one lamp (5) in phases includes an image signal outputting unit (1), a scaler (2), and a Microprogrammed Control Unit (MCU) (4). The MCU further includes a CPU (41), a timer (42), and a memory (43). The image signal outputting unit outputs image signals to the scaler. The MCU detects in real-time statuses of the image signals being input to the scaler. The timer records each elapsed time "Tn" during which no image signal is input to the scaler. The CPU compares the elapsed time "Tn" with preset times stored in the memory, and sends a control signal to the scaler according to the comparison result. The scaler generates PWM waves with a corresponding duty cycle according to the control signal, in order to control the luminance of the lamp. A related method for prolonging lamp lifetime is also provided.

16 Claims, 4 Drawing Sheets

APPARATUS AND METHOD FOR PROLONGING LAMP LIFETIME

BACKGROUND OF THE INVENTION

1. Field of the Invention

The present invention relates to apparatuses and methods that can prolong the lifetime of at least one electric lamp, and particularly to an apparatus and method which can prolong the lifetime of at least one Liquid Crystal Display ("LCD") backlight lamp.

2. Related Art of the Invention

Images displayed by an LCD are produced by many liquid crystal molecules which do not emit light themselves. Rather, in a typical LCD, one or more high intensity lamps in a backlight module of the LCD illuminate the liquid crystal molecules. For example, one or more cold cathode fluorescent lamps may be employed. The high intensity lamps gradually age over time, which can result in a yellow display. To avoid yellowing and to prolong the lifetime of the lamps, users can adjust the luminance of the lamps to a reduced level, and/or simply turn off the lamps when the LCD is not actually being used.

The technology of prolonging the lifetime of lamps includes power management by way of an associated computer. If no input from a user is received by the computer over a short period of time, the computer automatically shuts off the lamps. Nowadays, computer manufacturers provide shortcut keying to facilitate users in turning off the lamps. In particular, when a user wants to shut off the lamps for a short moment, the user need only press the shortcut keys provided by the computer manufacturer.

However, turning off the lamps in a very short time also wears out the lamps. The sharp changes of current passing through the lamps damage the fluorescent powder of the lamps, and can age the lamps prematurely.

Thus there is a need for an apparatus and method which can not only shut off lamps when they are not needed, but also avoid the sharp changes of current passing through the lamps.

SUMMARY OF THE INVENTION

Accordingly, a main objective of the present invention is to provide an apparatus and method which can reduce the unneeded luminance of at least one lamp in phases and prolong the lifetime of the lamp.

To accomplish the above objective, an apparatus for prolonging lamp lifetime ("the apparatus") is provided herein. The apparatus is connected to at least one lamp in order to control its illumination. The apparatus comprises an image signal outputting unit, a scaler, an inverter, and a Microprogrammed Control Unit (MCU). The image signal outputting unit is for outputting image signals to the scaler. The scaler is for receiving the image signals from the image signal outputting unit, and generating Pulse Width Modulation (PWM) waves with different duty cycles. Such PWM waves are inverted to alternating current with a different intensity to adjust the current of a lamp, and therefore control the luminance of the lamp. The MCU comprises a Central Processing Unit (CPU), a timer, and a memory. The timer is used for recording an elapsed time during which no image signal is input to the scaler. The memory is used for storing a plurality of preset times and preset percentages. Each preset percentage indicates a ratio of corresponding reduced luminance of the lamp to normal luminance of the lamp. The CPU is used for detecting statuses of the image signals being input to the scaler, obtaining the elapsed time recorded by the timer, comparing the elapsed time with the preset times stored in the memory, and generating control signals to control the scaler. The control signals control the scaler to generate PWM waves with corresponding duty cycles, and PWM waves with a corresponding duty cycle adjust the luminance of the lamp to a corresponding intensity. Such adjustment may be recovering the lamp to a normal luminance, or reducing the luminance to a preset percentage of the normal luminance.

Further, the present invention provides a method for prolonging lamp lifetime, the method comprising the steps of: (a) detecting in real time statuses of image signals being input to a scaler; (b) starting a timer to record an elapsed time during which no image signal is being input to the scaler; and (c) reducing luminance of a lamp in phases.

Step (c) comprises: (c1) determining in real time whether the elapsed time timed by the timer reaches a preset time; (c2) controlling the scaler to generate PWM waves with a corresponding duty cycle if the elapsed time reaches the preset time, wherein the PWM waves are used for reducing the luminance of the lamp to a preset percentage of normal luminance; (c3) maintaining the lamp at a current luminance and continuing to record the elapsed time if the elapsed time has not reached any particular time; and (c4) continuing to detect in real time the statuses of the image signals being input to the scaler.

These and other objects, advantages and novel features of the present invention will be drawn from the following detailed description of a preferred embodiment and method in conjunction with the attached drawings, in which:

DETAILED DESCRIPTION OF THE PREFERRED EMBODIMENT

Figure 1:
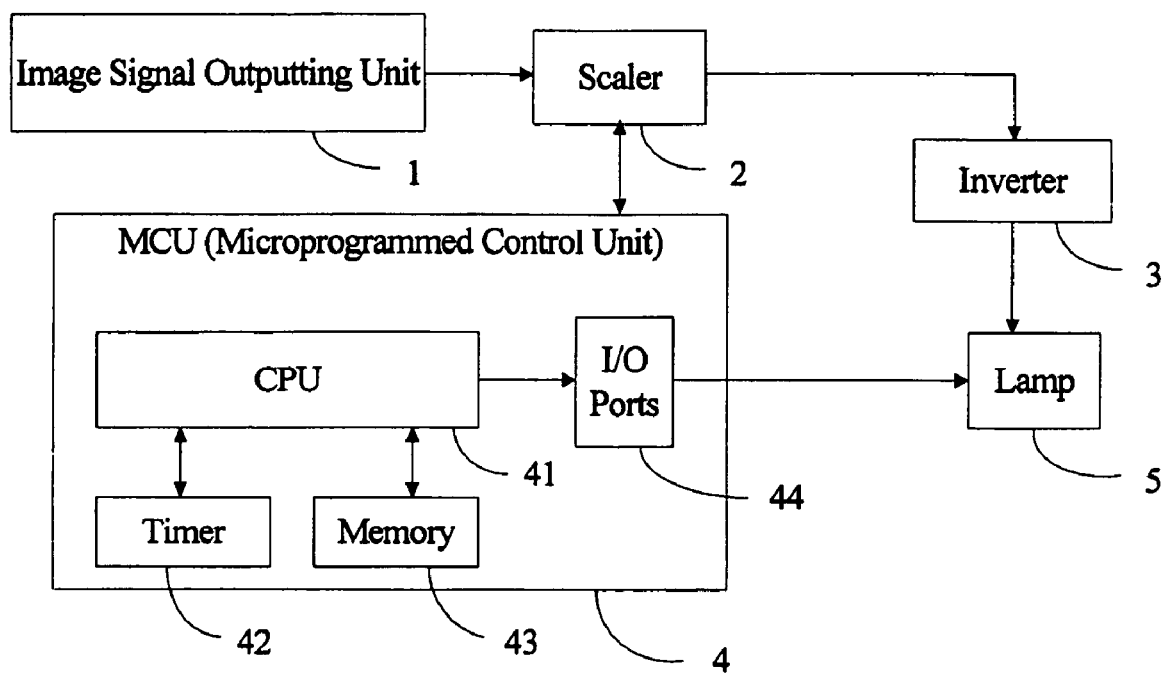
FIG. 1 is a block diagram of hardware infrastructure of an apparatus for prolonging lamp lifetime in accordance with a preferred embodiment of the present invention.

FIG. 1 is a block diagram of hardware infrastructure of an apparatus for prolonging lamp lifetime (hereinafter "the apparatus") in accordance with the preferred embodiment, The apparatus is connected to one or more lamps 5 in order to control their illumination. For simplicity, only one lamp 5 is shown in FIG. 1, and only the shown lamp 5 will be described hereinafter. Nevertheless, the description is not to be construed as limiting the invention to any particular number of lamps 5. The apparatus comprises an image signal outputting unit 1, a scaler 2, an inverter 3, and a Microprogrammed Control Unit (MCU) 4. The image signal outputting unit 1 is used for outputting image signals to the scaler 2. The scaler 2 is used for receiving the image signals from the image signal outputting unit 1, and generating Pulse Width Modulation (PWM) waves with different duty cycles. In the preferred embodiment, such PWM waves are then inverted to alternating current with different intensities, in order to adjust the current of the lamp 5 and therefore control the luminance of the lamp 5. The MCU 4 is used for detecting statuses of the image signals being input to the scaler 2, and for controlling the scaler 2 to generate PWM waves with different duty cycles according to the stanises of the image signals being input to the scaler 2. The MCU 4 comprises a Central Processing Unit (CPU) 41, a timer 42, a memory 43, and a plurality of input/output (I/O) ports 44.

Both the timer 42 and the memory 43 are connected to and controlled by the CPU 41. The timer 42 is used for recording an elapsed time T during which no image signal is input to the scaler 2. The memory 42 may be a RAM (random-access memory), a ROM (read-only memory), or any other non-volatile memory such as a PROM (programmable read-only memory), an EPROM (erasable and programmable read-only memory), an EEPROM (electrically erasable programmable read-only memory) or a Flash memory. The memory 42 is for storing a plurality of preset times and preset percentages. Each preset percentage corresponds to a respective preset time. The number of preset percentages equals the number of phases in which the luminance of the lamp 5 is to be reduced. For example, if the luminance of the lamp 5 is to be reduced in N phases, the memory 42 stores N preset times (T1, T2, . . . , Tn) and N corresponding percentages (X1%, X2%, . . . , Xn%). Each preset percentage indicates a ratio of a corresponding reduced luminance of the lamp 5 to a normal luminance of the lamp 5. Generally, the preset times (T1, T2, . . . , Tn) sequentially increase in value, while the preset percentages (X1%, X2%, . . . , Xn%) sequentially decrease in value. That is, T1<<T2< . . . <Tn, and X1%>X2%> . . . >Xn%. When the elapsed time T recorded in the timer 41 reaches T1, the luminance of the lamp 5 is reduced to X1% of the normal luminance. When the elapsed time T reaches T2, the luminance of the lamp 5 is reduced to X2% of the normal luminance. Finally, when the elapsed time T reaches Tn, the luminance of the lamp 5 is reduced to Xn % of the normal luminance.

The CPU 41 is used for detecting the statuses of the image signals being input to the scaler 2, obtaining the elasped time T recorded by the timer 41, comparing the elapsed time T with the preset times stored in the memory 43, and generating various control signals to control the scaler 2. Each time the CPU 41 generates a control signal, the scaler 2 generates PWM waves with a particular duty cycle accordingly. The PWM waves are used to adjust the luminance of the lamp 5 to a corresponding intensity, such as recovering the luminance to the normal luminance, or reducing the luminance to a preset percentage of the normal luminance. According to the preferred embodiment, if the CPU 41 determines that no image signals are being input to the scaler 2, the CPU 41 starts the timer 42 to record an elapsed time T during which no image signal is input to the scaler 2. If the elapsed time T reaches a preset time, the CPU 41 generates and sends a control signal (hereinafter referred to as "Control Signal I") to the scaler 2. The scaler generates PWM waves with a duty cycle according to the Control Signal I, and adjusts the luminance of the lamp 5 to a corresponding preset percentage of the normal luminance. If the elapsed time T does not reach any preset time, the scaler 2 generates PWM waves having an unchanges duty cycle, thereby maintaining the luminance of the lamp 5 at the current luminance. If the CPU 41 determines that image signals are being input to the scaler 2 when the timer 42 is recording the elapsed time T, the CPU 41 generates another signal (hereinafter referred to as "Control Signal II") to the scaler 2. The scaler 2 generates PWM waves with a corresponding duty cycle according to the Control Signal II, and recovers the luminance of the lamp 5 from a current luminance to the normal luminance.

The I/O ports 44 are used for connecting the lamp 5 to the CPU 41, and for enabling the CPU 41 to turn on and turn off the lamp 5. The inverter 3 is used for inverting PWM waves to alternating current having a certain intensity, in order to control the luminance of the lamp 5.

Figure 2:
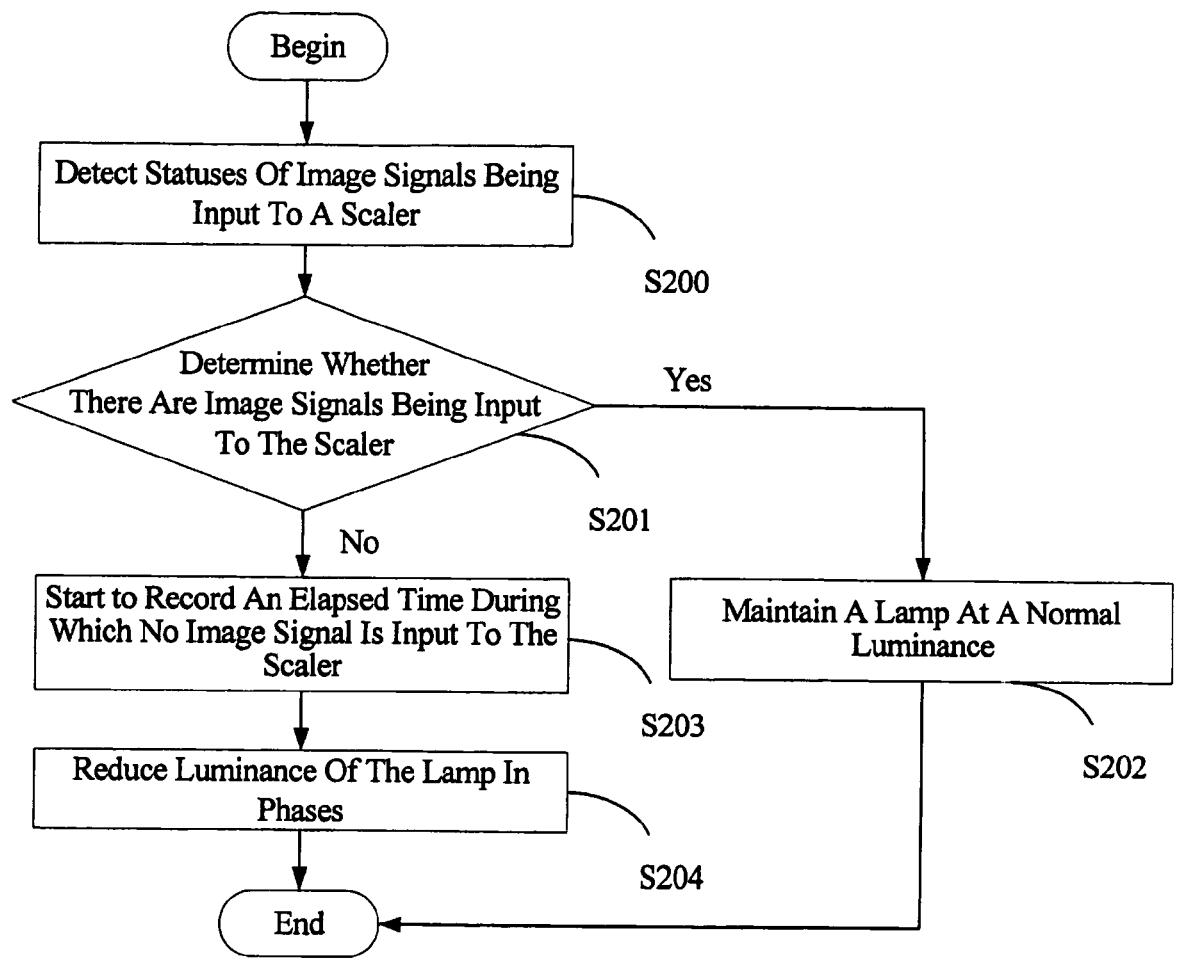
FIG. 2 is a flowchart of a preferred method for operating the apparatus of FIG. 1.

FIG. 2 is flowchart of a preferred method for operating the apparatus. In step S200, the MCU 4 detects statuses of the image signals being input to the scaler 2. In step S201, the CPU 41 determines whether there are image signals being input to the scaler 2. If there are image signals being input to the scaler 2, in step S202, the scaler 2 generates PWM waves with an unchanged duty cycle. This maintains the lamp 5 at the normal luminance, and the procedure is ended. If no image signal is being input to the scaler 2, in step S203, the CPU 41 starts the timer 42 to record an elapsed time T during which no image signal is input to the scaler 2. In step S204, the MCU 4 and the scaler 2 cooperate to reduce the luminance of the lamp 5 in phases (described in detail below in relation to FIG. 3), whereupon the procedure is ended.

Figure 3:
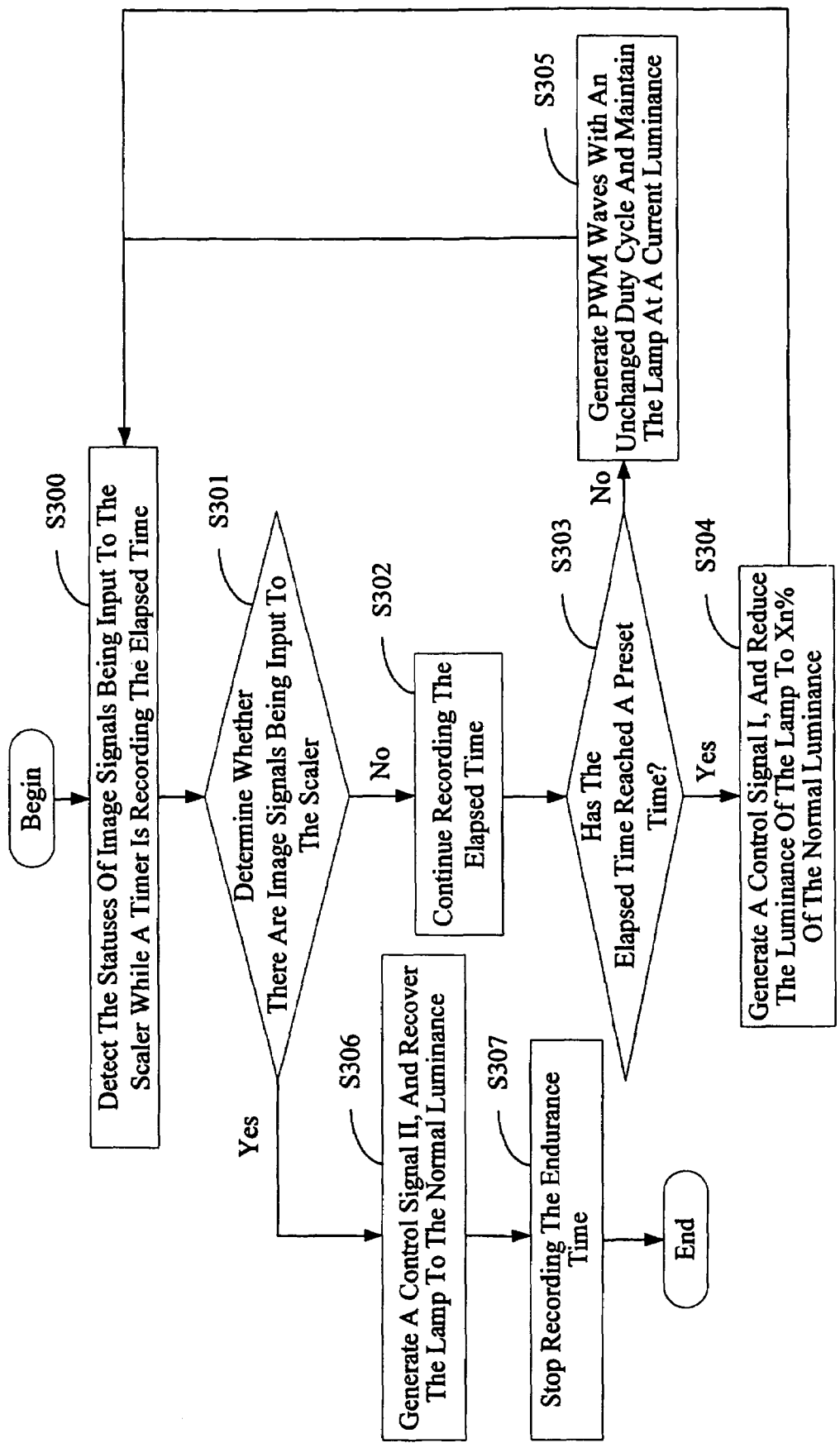
FIG. 3 is a flowchart of details of one step of FIG. 2, namely reducing the luminance of a lamp in phases.

FIG. 3 is a flowchart of details of step S204 of FIG. 2, namely reducing the luminance of the lamp 5 in phases. In step S300, the MCU 4 detects in real time the statuses of the image signals being input to the scaler 2 while the timer 42 is recording the elapsed time T. In step S301, the CPU 41 determines in real time whether there are image signals being input to the scaler 2, according to the statuses of the image signals being input to the scaler 2. If no image signal is being input to the scaler 2, in step S302, the timer 42 continues recording the elasped time T. In step S303, the CPU 41 compares in real time the elapsed time T with preset times stored in the memory 43, and determines whether the elapsed time T has reached a particular preset time Tn. If the elapsed time T has reached the preset time Tn, in step S304, the CPU 41 generates a Control Signal I, and the scaler 2 generates PWM waves with a duty cycle according to the Control Signal I. The PWM waves are inverted to alternating current with a certain intensity by the inverter 3. The luminance of the lamp 5 is thereby reduced to Xn% of the normal luminance, whereupon the procedure returns to step S300 described above. If the elapsed time T has not reached the preset time Tn, then in step S305, the scaler 2 generates PWM waves having an unchanged duty cycle. This maintains the lamp 5 at its current luminance, whereupon the procedure returns to step S300.

If the CPU 41 determines that there are image signals being input to the scaler 2 when the timer 42 is recording the elapsed time T, then in step S306, the CPU 41 generates a Control Signal II, and the scaler 2 generates PWM waves having a duty cycle according to the Control Signal II. The PWM waves are inverted to alternating current, and the luminance of the lamp 5 is recovered to the normal luminance. In step S307, the CPU 41 stops the timer 42 recording the elapsed time T, and initializes the timer 42 to zero.

Figure 4:
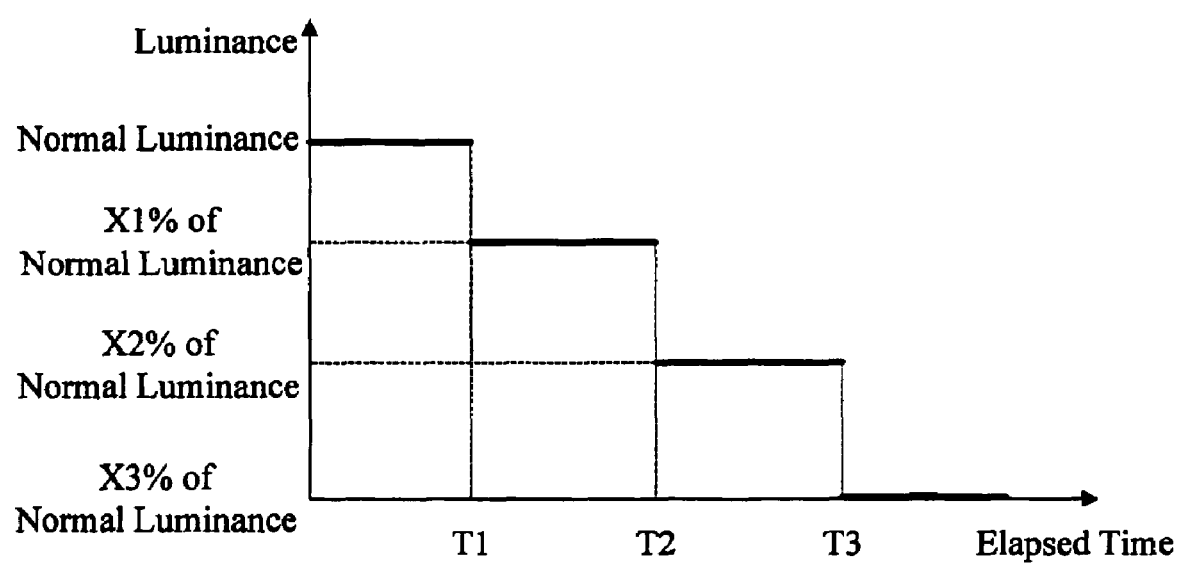
FIG. 4 is a graph of luminance of a lamp varying according to elapsed time recorded by a timer of the apparatus of FIG. 1, showing the luminance of the lamp being reduced in three phases according to the preferred embodiment of the present invention.

FIG. 4 is a graph of luminance variation of the lamp 5 when the luminance of the lamp 5 is reduced in three phases I, II, III. During all three phases I, II, III, it is assumed that the MCU 4 does not detect any image signal being input to the scaler 2. In phase I, once the elapsed time T recorded by the timer 42 reaches a preset time T1, the luminance of the lamp 5 is reduced to X1% of the normal luminance. In phase II, once the elapsed time T recorded by the timer 42 reaches a preset time T2, the luminance of the lamp 5 is reduced to X2% of the normal luminance. In phase III, once the elapsed time T recorded by the timer 42 reaches a preset time T3, the luminance of the lamp 5 is reduced to X3% of the normal luminance. Generally, X3% is set to be zero. Once the luminance of the lamp 5 is reduced to zero at the end of phase III, the lamp 5 is maintained in a dormant state, which prolongs the lifetime of the lamp 5. If, during any of the phases I, II, III, the MCU 4 detects any image signal being input to the scaler 2, then the luminance of the lamp 5 is immediately recovered to the normal luminance, and the current process of phased reduction of the luminance of the lamp 5 is canceled.

Although the present invention has been specifically described on the basic of a preferred embodiment and a preferred method, the invention is not to be construed as being limited thereto. Various changes and modifications may be made to the embodiment and method without departing from the scope and the spirit of the invention.

What is claimed is:

1. An apparatus for prolonging lamp lifetime by reducing unneeded luminance of at least one lamp in phases, the apparatus comprising a scaler for receiving image signals, and a Microprogrammed Control Unit (MCU) for detecting in real time statuses of image signals being input to the scaler, wherein:

the MCU comprises:
a timer for recording an elapsed time during which no image signal is input to the scaler;
a memory for storing a plurality of preset times and preset percentages, wherein each preset percentage corresponds to a respective preset time and indicates a ratio of a corresponding reduced luminance to a normal luminance of a lamp; and
a Central Processing Unit (CPU) for comparing the elapsed time recorded by the timer with the preset times, and generating various control signals according to various comparison results; and
the sealer generates Pulse Width Modulation (PWM) waves with duty cycles according to the control signals of the CPU, the PWM waves being used for adjusting the luminance of said lamp.

2. The lamp apparatus for prolonging lamp lifetime according to claim 1, further comprising an image signal outputting unit for outputting image signals to the scaler.

3. The apparatus for prolonging lamp lifetime according to claim 1, further comprising an inverter for inverting the PWM waves into alternating current having certain intensities and thus controlling the luminance of said lamp.

4. The apparatus for prolonging lamp lifetime according to claim 1, wherein when an elapsed time recorded by the diner reaches a preset time stored in the memory, and the MCU has not detected any image signal input to the scaler during the elapsed time, the CPU generates and sends a first control signal to the scaler.

5. The apparatus for prolonging lamp lifetime according to claim 4, wherein the scaler generates PWM waves with a duty cycle according to the first control signal received from the CPU.

6. The apparatus for prolonging lamp lifetime according to claim 5, wherein the PWM waves are used for reducing the luminance of said lamp to a corresponding preset percentage of the normal luminance.

7. The apparatus for prolonging lamp lifetime according to claim 1, wherein when the MCU detects that image signals are being input to the scaler while the timer is recording an elapsed time, the CPU generates and sends a second control signal to the scaler.

8. The apparatus for prolonging lamp lifetime according to claim 7, wherein the scaler generates PWM waves with a corresponding duty cycle according to the second control signal received from the CPU.

9. The apparatus for prolonging lamp lifetime according to claim 8, wherein the PWM waves are used for recovering the luminance of said lamp to the normal luminance.

10. The apparatus for prolonging lamp lifetime according to claim 1, wherein when the MCU detects that image signals are being input to the scaler while the timer is recording an elapsed rime, the CPU stops the tinier from recording the elapsed time and initializes the timer to zero.

11. A method for prolonging lamp lifetime by reducing unneeded luminance of at least one lamp in phases, the method comprising:
detecting in real time statuses of image signals being input to a scaler;
starting a timer to record an elapsed time during which no image signal is input to the scaler;
reducing a luminance of said lamp in phases during the elapsed time each phase comprising:
determining in real time whether the elapsed time timed by the timer reaches a preset time;
controlling the scaler to generate Pulse Width Modulation (PWM) waves with a particular duty cycle if the elapsed time reaches a particular preset time, wherein the PWM waves are used for reducing the luminance of said lamp to a preset corresponding percentage of a normal one of the luminance; and
maintaining said lamp at the reduced luminance; and
continuing to record the elapsed time if the elapsed time has not reached the present time of any one of the phases.

12. The method for prolonging lamp lifetime according to claim 11, further comprising the step of controlling the scaler to generate PWM waves with another corresponding duty cycle if the image signals are detected being input to the scaler, the PWM waves recovering the luminance of said lamp to the normal one of the luminance.

13. The method for prolonging lamp lifetime according to claim 12, further comprising the step of stopping the timer from recording the elapsed time and initializing the timer to zero.

14. A method for controlling luminance of a lamp to prolong a lifetime thereof, said lamp keeping normal luminance thereof by means of recognizing a signal from an outputting unit, said method comprising the steps of:
detecting generation of said signal from said outputting unit;
recording elapsing time when said generation of said signal is not available;
reducing said luminance of said lamp proportionally by a first percentage in case that said elapsing time reaches a first preset time value; and
reducing said luminance of said lamp proportionally by a second percentage larger than said first percentage in case that said generation of said signal is continuously not available and said elapsing time reaches a second preset time value larger than said first preset time value.

15. The method according to claim 14, further comprising the step of restoring said luminance of said lamp to the normal luminance when said generation of said signal is available and detected.

16. The method according to claim 14, further comprising the step of repeating said luminance reducing step by using a third percentage larger than said second percentage in case that said generation of said signal is continuously not available and said elapsing time reaches a third preset time value larger than said second preset time value.

* * * * *